Figure 1:
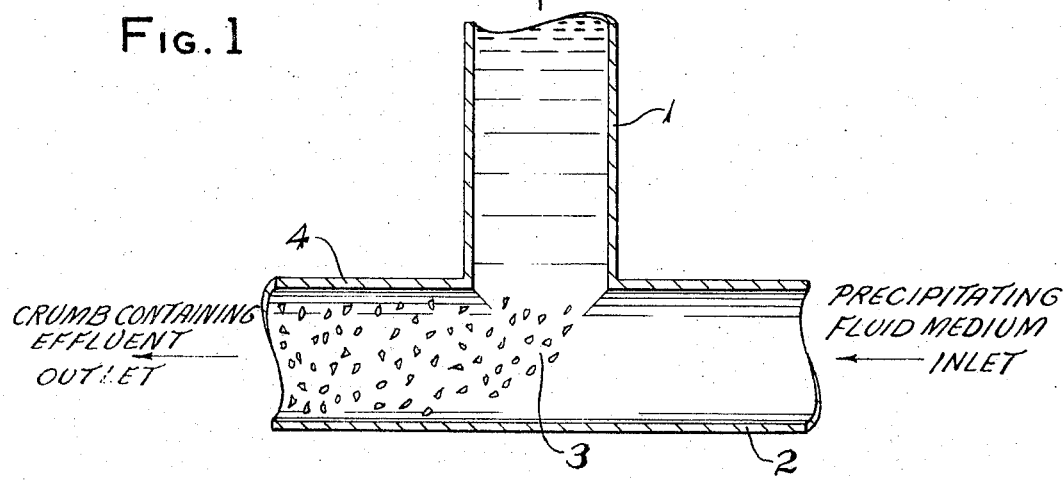

Feb. 28, 1967   J. G. DI SALVO ETAL   3,306,342
FLUID PROCESSES USEFUL IN PRECIPITATION OF DISSOLVED SOLIDS
Filed March 2, 1966   2 Sheets-Sheet 1

INVENTORS
JOSEPH GEATANO DI SALVO
JOHN SAMUEL BROOKS WOLFE

BY Louis G. Weisz
ATTY.

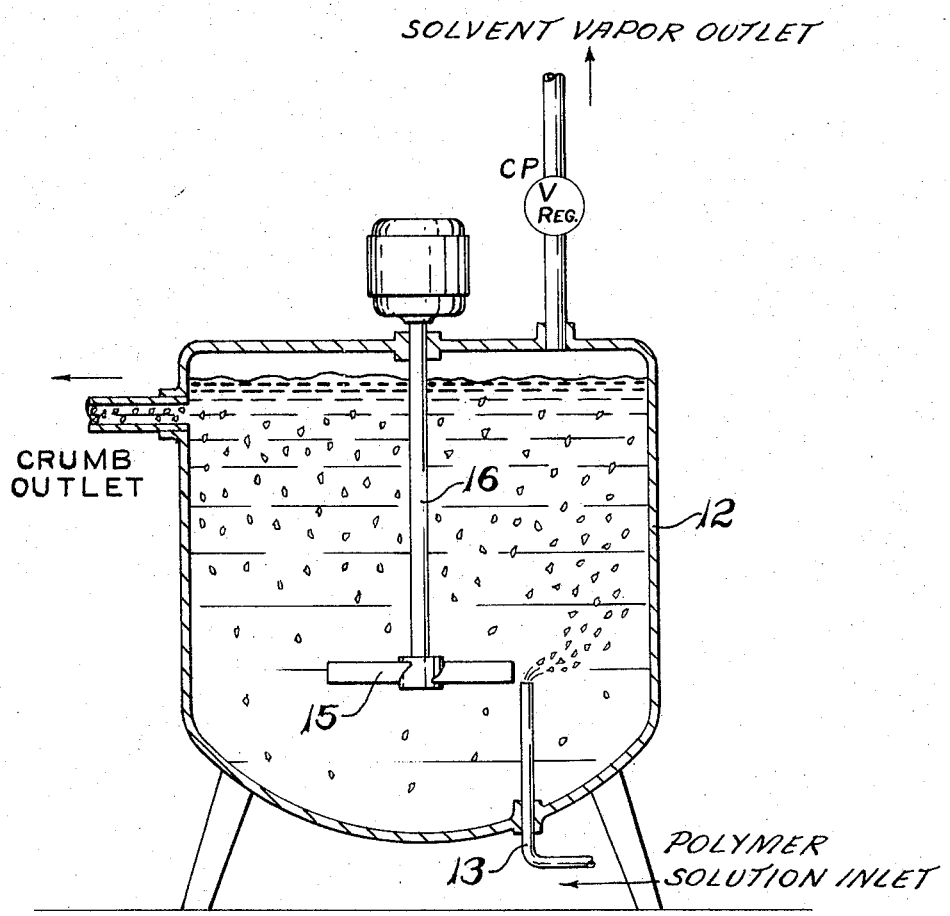

United States Patent Office 3,306,342
Patented Feb. 28, 1967

3,306,342
FLUID PROCESSES USEFUL IN PRECIPITATION OF DISSOLVED SOLIDS
Joseph Geatano Di Salvo, Avon Lake, and John Samuel Brooks Wolfe, Broadview Heights, Ohio, assignors to Goodrich-Gulf Chemicals, Inc., Cleveland, Ohio, a corporation of Delaware
Filed Mar. 2, 1966, Ser. No. 536,531
5 Claims. (Cl. 159—47)

This application is a continuation-in-part of application Serial No. 265,906, filed March 18, 1963, and now abandoned.

This invention relates to the precipitation of solid substances from solutions; more particularly, however, this invention relates to the precipitation of polymeric materials from solutions containing them, brought about by contacting such solutions with a fluid medium capable of inducing precipitation of the materials.

In the chemical arts, it is frequently of advantage to carry out a desired chemical reaction in a solvating medium; thus processes in which the reactants and product obtained are present in the reaction mixture as a homogenous solution, are commonly encountered. Among processes in which the product is formed in solution may be mentioned, for example, the production of sodium catalyzed polybutadiene, an elastomeric material produced as a solute in a paraffinic hydrocarbon; the manufacture of butyl rubber, a copolymer of isobutylene and isoprene polymerized in methylchloride-a solvent medium capable of dissolving appreciable amounts of the elastomeric product; various steroregular polymers produced with Ziegler catalyst, i.e., mixtures of organo-aluminum-heavy metal transition compounds, such as polybutadiene and polyisoprene; and many others.

Following production of the desired material in solution form, it is normally necessary to free the product from its solvent so as to obtain the material in a solid form. Among the various methods which have been proposed for accomplishing the separation of dissolved elastomeric products from accompanying solvent may be mentioned, for example, one involving the introduction of the product containing solution into a vessel containing a liquid, frequently water. maintained at an elevated temperature. In one variation of this technique, the elastomer containing solution enters the vessel over the surface of the liquid and drops into the precipitating medium wherein the solvent is vaporized. Although this method produces a solid product, the precipitated particles have a tendency to be of variable size, and some of the material is present in the form of relatively large agglomerates. Since it is usually necessary to substantially eliminate solvent from the product before it can be processed into useful articles, large particles and particle agglomeration are undersirable for the reason that solvent migration in subsequent drying operations takes appreciably longer to accomplish; consequently, many times solvent elimination becomes impossible in commercially practical drying times. Variable particle size also creates difficulties in establishing uniform drying procedures because, depending upon the particle size, longer or shorter drying periods may be required.

Now a procedure has been discovered, however, by means of which relatively small size particles of elastomeric products may be precipitated from solution. Besides being small and conducive to solvent removal, the particles are generally of a uniform size and greatly facilitate standardization of drying and other procedures. Of considerable advantage in the discovered process is the fact that no emulsifying agents are required to obtain a desirable particle size; therefore, the elastomeric product is less costly, and the same is not contaminated with materials which may interfere with subsequent processing techniques and desirable product characteristics. In one of its embodiments, the process permits temporary disruptions of flow to be corrected without removing the equipment involved from service, a feature of commercial importance. These and additional advantages are readily apparent in the following disclosure.

In accordance with this invention, the separation from liquids of solids substantially dissolved therein is accomplished by a process comprising violently hydraulically contacting a suspension of the solid containing solution and water, with a precipitating fluid medium whereby fragmentation of the solution is accomplished substantially contemporaneously with solvent volatilization, and the solid matter precipitated as relatively uniform, discrete particles of reduced size.

In carrying out the process of the invention, the solution containing the dissolved polymer, which may include undissolved polymer in addition to the dissolved polymer, a liquid system hereinafter called the "polymer solution" or "cement," is combined with water to form a suspension referred to hereinafter as the "suspension" and the latter is brought into violent hydraulic contact with a fluid medium which may be either a gas or a liquid and which is incompatible with existence of the solid in a solution form. Upon being so contacted, the polymer contained in the polymer solution is suddenly precipitated from solution in the form of advantageously finely-divided, uniform particles or "crumbs." Incompatibility sufficient to produce the desired effect is obtained through the use of a fluid medium containing sufficient heat to vaporize a substantial amount of the solvent portion of the solution upon contact, producing the solids in a finely-divided state. Steam has been found to be ideally suited to use in the inventive process as a fluid medium since it readily permits violent agitation and a high degree of heat to be supplied to the polymer solution simultaneously.

Certain advantages have been found to reside in the use of a T-shaped mixing device for the purpose of securing the turbulent and intimate contact required to induce ideal precipitation. If desired, the T may be equipped with a perforated section in that part or "leg" of the T through which the polymer solution enters, and the use of such a modification, while unnecessary, assists in attenuation of the polymer solution especially conducive to the fragmentation necessary for formation of ideally-conformed crumbs. If preferred the mixing device may also have included therein provision for addition of an auxiliary liquid capable of promoting movement of precipitated crumbs through the coagulation system. The latter addition is particularly useful when the precipitated solids are discharged from a mixing device into a collecting liquid.

The accompanying drawings show various embodiments of the invention which may be employed. FIGURE 1, which is a cross-sectional view, illustrates a typical T-shaped mixing device wherein the suspension enters through leg 1. The fluid medium is introduced through leg 2 to produce impact fragmentation and precipitation in and around area 3. The crumb containing effluent is subsequently discharged through leg 4 of the T.

Figure 2:
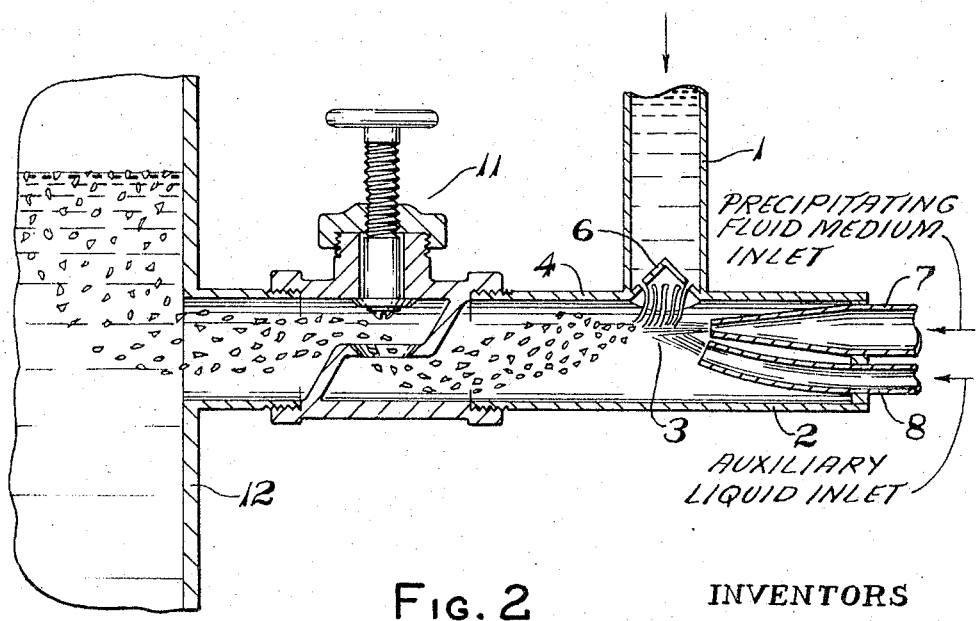

FIGURE 2, representing still another embodiment of the invention portrays a cross-sectional view in which the suspension enters leg 1, the vertical leg of a T mixing device, through a conical plate, 6, having disposed therein a plurality of small holes. The fluid medium enters the device through nozzle 7, entering horizontal leg 2 of the T to produce precipitation in and about area 3. Provision for addition of an auxiliary liquid is made through inclusion of nozzle 8 also entering through leg 2 of the T.

A valve, 11, is positioned between the mixing area and a liquid reservoir, 11, into which the solid containing effluent is discharged.

FIGURE 3 shows still another embodiment of the invention in which the suspension enters a rapidly moving stream of fluid medium, in this case an agitated portion of the liquid container in tank 12, through an inlet, 13, the open end of which is located adjacent the tip of an impeller blade, 15, connected to, and rotated by a motor-driven shaft, 16.

The unique advantages obtainable through use of the disclosed invention are the result of substantially simultaneously fragmenting the polymer solution and contacting the separated parts with a fluid medium capable of precipitating the solids from solution. The fragmentation necessary to produce the desired sub-division of polymer solution is in large measure produced by the invention through hydraulic shear. Use of the hydraulic shear principal not only produces superior attrition of the solution, but also permits substantially simultaneous contact of all parts of the fragmented polymer solution with the precipitating fluid medium inasmuch as the substance used to produce the hydraulic shear and the precipitating fluid medium are one and the same. This simultaneous action, in many cases, produces an almost explosively instantaneous change in the phase of the polymeric product contained by the polymer solution. Such rapid transition is to a large extent responsible for the uniformly small particles which can be obtained. In addition, particles thus produced exhibit a porous structure which facilitates subsequent drying and permits elastomeric product to be produced which contains only a slight amount of residual solvent.

The desired hydraulic shear is produced by bringing the two streams i.e., the suspension and the fluid medium into contact with each other in any manner which provides a zone of violent turbuence in which the continuity of the polymer solution is destroyed. Of special advantage, however, is an arrangement which directs one of the streams against another at an angle, and while any angle sufficient to provide the degree of turbulence desired may be employed, an impact angle of between about 30° and about 90° provides certain advantages, the latter angle being particularly effective in bringing about a satisfactory degree of polymer solution attrition.

Although impact of the streams may be carried on in several ways, of convenience and preferred in this invention is the use of a housing into which the streams are fed, and conformation of such a "mixing device" in roughly the form of a T has proven to be particularly suitable to the inventive purposes. In such a device, the suspension is introduced into one leg of the T, the fluid medium enters through a second, and the precipitated polymer containing effluent leaves by way of the third. It has been found that uniformly fine, porous particles of polymer are particularly easy to produce when the suspension enters the mixing device through the "vertical" leg of the T. It is not to be inferred, however, that the suspension must enter through the vertical leg nor, indeed, that the suspension need enter in any particular direction. Complete interchangeability is possible with respect to the leg of the T into which a particular stream is fed.

A particularly desirable modification of the invention is one in which the suspension stream is sub-divided into a number of smaller streams by being passed through a plurality of small holes before being impacted with the fluid medium. Preliminary sub-division of the suspension stream in this manner facilitates superior fragmentation and consequently produces improved particles. The method by which preliminary sub-division is achieved is susceptible to a wide number of variations. A simple plate containing a plurality of small holes can be positioned in the leg through which the suspension enters the mixing device, or alternatively, a conical section having a number of small holes disposed therein—conducive to production of laminar flow—can be placed in the suspension leg. Numerous variations in the technique of preliminary sub-division may be employed; however, it is of advantage that sub-division be accomplished just prior to the point at which impact of the two streams is achieved.

The fluid medium may simply be fed into a leg of a mixing device, as in FIGURE 1, or it may enter a leg of a mixer through a nozzle the end of which, for example, is located immediately adjacent the leg through which the suspension enters, as in FIGURE 2. The latter variant has been found to yield particularly violent turbulence in the mixing zone and is preferred.

Effluent from the mixer, which consists primarily of precipitated solid particles and fluid medium, leaves the mixing device through the latter's remaining leg. Such effluent may be discharged directly into air as, for instance, into a spray dryer where residual solvent and fluid medium are substantially completely separated from the particles. It may be also, however, discharged into a hot liquid where remaining solvent can be removed.

When discharge of the effluent is into a vessel containing a liquid such as, for example, hot water, provision of a valve between the mixing device and the water-containing vessel, as illustrated in FIGURE 2 of the drawings, is of advantage since maintenance of the mixing device is then possible without draining the vessel. While different types of valves may be used for this application, a gate valve has less tendency to plug with rubber particles and for that reason is preferred.

As indicated above, discharge of the mixer effluent into a liquid, preferably hot, is of considerable help in producing elastomer crumbs having a low degree of residual solvent. In such an embodiment of the invention, introduction of the effluent beneath the surface of the hot liquid, such as water, is desirable. Crumbs entering the liquid are readily maintained in suspension by agitation for a period sufficient to substantially reduce their solvent content. If desired, a nozzle can be included in the mixing device for introduction of an auxiliary liquid, also termed "motive fluid," which produces an overflow condition in the vessel into which the effluent is discharged, providing a means for removing the crumb product therefrom. When the nozzle supplying such a motive fluid is located adjacent to the inlet of the suspension stream, as shown in FIGURE 2, the motive fluid serves as an auxiliary source of hydraulic shear and facilitates production of uniformly small crumbs.

Although the preferred embodiment of the invention comprehends a mixing device located exteriorly to a liquid-containing vessel into which the effluent is discharged, it is entirely conceivable to provide the necessary hydraulic shear inside the liquid-containing vessel. This may be accomplished by providing a Brumagim, turbine-type impeller, or similar mixing device in the interior of the vessel. In such a process, the suspension is piped to a point immediately adjacent the peripheral area near, preferably at, the end of the impeller blades. Hot liquid—the fluid medium—in the tank, driven by the impeller across the suspension inlet pipe, provides an action similar to that of an external mixer although somewhat less efficient. Such a system is exemplified by FIGURE 3 of the drawings.

The temperature of the entering suspension stream is not particularly critical and may be varied within a wide range. It is, for instance, possible to employ such a stream maintained at ambient temperatures, i.e., approximately 22 degrees C. or lower. One may, however, if preferred, preheat the suspension, for example, to 80 degrees C. or higher. Operation at higher temperatures is many times of advantage since the polymer solution passing through a perforated plate located in the T, supra, encounters a pressure drop which can be sufficient to cause the solvent contained to flash even more violently than in the case where no preheat is supplied to the polymer solution, thus producing a particularly small-sized crumb.

Although the reason for such effort is not entirely understood, it has been found that the inclusion of water with the polymer solution to provide a mixture of the two in the form of a suspension greatly improves desirable crumb characteristics such as size uniformity, porosity and the degree of attrition. While not intending to be bound by the theory, it is possible that the advantages realized from the use of such a suspension derive from the fact that the suspension, in effect, provides a preliminary subdivision of the polymer solution which promotes subsequent fragmentation upon impact with the fluid medium. It may also be that polymer solutions which are at least saturated with water shear more easily than would otherwise be the case. In any event, employment of a suspension including both a solution of polymer in a substantially water-immiscible solvent, and water, in which the water present is in the range from at least slightly in excess of that required to saturate the polymer solution to about 100 volume percent water, based on the total volume of the mixture present, provides the improvements sought. A suspension containing from about 1% to about 50% water, however, generally assures sufficient relative amounts of two distinct liquid phases to produce superior fragmentation and consequently much better crumb formation. In the preferred embodiment, from about 5% to about 20% water on a volume basis is employed. The presence of water is particularly effective when the solvent component of the polymer solution is a hydrocarbon such as benzene, butene, benzene/butene-1 mixtures and the like, and when the dissolved polymer is one such as, for example, polyisoprene, polybutadiene, copolymers and terpolymers containing both ethylene and propylene monomeric units, copolymers containing styrene and butadiene monomeric units, as well as similar substances, especially when the same are produced with a Ziegler catalyst.

The fluid medium necessary to produce the precipitation of solid product from the polymer solution may be either a gas or liquid the presence of which in contact with the polymer solution is incompartible with maintenance of an exclusively liquid phase. Such compatibility can result, in the case of gases, when sufficient heat is contained by the gas to cause loss of solvent from the solution, through evaporation, to the extent necessary to induce the desired precipitation. Similarly, in those cases in which liquids are employed, a non-solvent liquid hot enough to accomplish the required amount of solvent evaporation from the polymer solution produces the desired result.

The amount of heat to be supplied by the fluid medium will, of course, depend upon such things as the nature of the solvent and the solute; heat loss from the mixing device; disposition of the effluent, i.e., whether into a hot liquid where additional volatilization of solvent is accomplished, into a spray dryer or otherwise; upon the acceptable level of solvent in the precipitated product, and similar factors. However, although lesser amounts of steam may be used, it is desirable that at least about 30% of the heat necessary to vaporize the solvent contained in the polymer solution be supplied by the fluid medium. Ordinarily, when steam is the fluid medium, the hydraulic shear necessary to produce acceptable fragmentation of the solution will be found to be the limiting factor, or stated in another way, when the amount of fluid medium necessary for successful attrition is provided, heat at least equal to that required to produce satisfactory precipitation will normally be present.

Many different fluid media may be employed for the purposes of the invention. When the fluid medium is a gas, for instance, any hot gas may be employed; preferred, however, are inert gaseous substances, such as, hot nitrogen, steam and the like. When a liquid fluid medium is used, substances such as hot water or non-solvents can be employed to advantage. One particularly useful system includes means for vigorously recycling the hot liquid into which mixer effluent may be discharged back through the mixer. In its preferred embodiment, however, the invention comprehends the use of steam as the fluid medium. Among the advantages inherent in the use of steam are its economy, ease of handling, the degree of turbulence which can be produced in the mixing zone, steam's heating capacity and similar considerations.

As in the case of heat content of the fluid meduim, the momentum necessary to produce satisfactory turbulence depends on the nature of the system employed to practice the invention disclosed herein. Important considerations comprise the nature of the mixing device, including the presence or absence of a perforated sub-dividing plate; location and shape of the fluid medium distribution nozzle; the manner in which the streams meet; the relative amounts of each of the streams; the nature of the fluid mediums; relative flow rates and numerous like considerations. The optimum operating conditions with respect to a particular system can readily be determined, however, and considerable latitude is permissible in adjustment of the fluid medium flow rate.

Although such values are not intended to be a limitation of the invention disclosed herein, and are not to be construed as such, it has been determined that when the fluid medium is steam and the solution is benzene/butene-1, Ziegler polymer containing solution, a fluid medium momentum of more than about 50, more preferably at least about 200 foot-pounds per second per pound of polymer solution impacted, produces superior crumbs.

Although different methods may be used to carry out the inventive process, in one of its preferred embodiments, cis-1,4 polybutadiene dissolved in a solvent mixture comprising benzene and butene-1 and containing water in the form of suspension, is preheated and passed through the vertical leg of a T mixing device. The flow rate is adjusted to the value at which it is desired to carry on the precipitation, and steam is introduced into one of the horizontal legs of the T. The flow of steam is normally increased to the point at which satisfactory fragmentation and precipitation is obtained—a point determined, advantageously, by visual observation of the effluent leaving the mixing zone of the T. In some instances, where the mixer effluent is passed into a vessel containing heated water, the steam flow is adjusted beyond that required for precipitation in order that the steam can serve the additional function of heating the water in the vessel to a desired point. In the case where the mixer effluent enters a water containing vessel, preferably agitated, the water-crumb suspension in the vessel may readily be withdrawn from the vessel by overflow produced through the addition of motive water to the mixing device. The overflow slurry of water and crumb may ultimately be separated into its component parts by being passed to a screening or similar operation, of the types well known in the art, useful in obtaining separation of liquids from solids. Crumbs thus obtained may readily be dried to produce a low solvent, high quality elastomeric product of considerable commercial value.

The folowing examples, while not intended to be limiting in nature, are illustrative of the invention.

*Example I*

In this experiment, a T mixing device—generally similar to that shown in FIGURE 2—is fabricated to include a 1½ inch diameter vertical leg having disposed therein a perforated 90° conical plate drilled with sixteen, $3/32$ inch, evenly spaced holes. The plate is fastened across the end of the vertical leg, the tip of the cone directed away from the direction of suspension flow, and positioned to extend into a 2-inch diameter horizontal pipe in a typical T conformation. Extending through one end of the horizontal leg of the T is a length of a one-inch tubing having a flattened end located immediately adjacent the perforated conical plate of the vertical leg, which serves as the entry conduit for the fluid medium, steam. Also entering the same horizontal leg immediately above the fluid inlet is a length of ½ inch tubing—the entry conduit for the motive water—having an end also positioned generally next to the perforated conical plate. The remaining horizontal leg of the T is connected through a large gate valve to a large enclosed vessel, referred to herein as the "coagulator vessel," which is provided with a vapor outlet at its top, leading to a condenser, and with a crumb outlet positioned in the vessel's side.

During the run herein detailed, the coagulator vessel is maintained about four-fifths full of water, having a temperature of 135° C., under 60 p.s.i.g. pressure.

The polymer solution or "cement" entering the T; containing approximately 8.3% by water on a volume basis, comprises the following components and flow rates;

| Material: | Amount—lbs. per min. |
|---|---|
| Cis-1,4 polybutadiene | 1.46 |
| Butadiene-1,3 | 0.62 |
| Benzene | 5.59 |
| Butene-1 | 3.73 |
| Water | 1.52 |

The cement stream is introduced to the vertical leg of the T device at a temperature of 20° C., in an upward direction, i.e., the vertical leg of the T is connected in a downward position.

In the experiment, motive water having a temperature of 20° C. is introduced into the mixing device at the rate of 6.67 lbs. per minute. Approximately 8.75 lbs. per minute of steam—140 p.s.i.g.—are also fed to the mixing device.

Calculation shows the following velocities to have been obtained in the mixing device during the experiment:

| Material: | Velocity—ft. per sec. |
|---|---|
| Cement velocity at perforated cone | 5.8 |
| Steam velocity at tip of entry conduit | 568. |
| Motive water velocity at tip of entry conduit | 1.3 |

Computation shows the momentum of steam to have been 436 ft. lbs. per second per pound of cement.

The impacted mixture, observed through a glass bull's-eye located in the line connecting the mixing device with the coagulator vessel, gives the appearance of comprising an almost exclusively gaseous phase throughout the run. While this is obviously not the case, it confirms the substantial volitilization of the liquid portion of the cement and provides an excellent indication that the process is being satisfactorily controlled.

The impacted mixture is introduced beneath the surface of the water contained in the coagulator vessel, and the crumbs are maintained in suspension by agitation. The level in the coagulator vessel is held substantially constant by means of a liquid level controller, and the crumbs leaving the coagulator vessel are found to possess an average diameter of 3/16 inch. Approximately 1.46 lbs. of polymer containing about .09 lb. of benzene, are removed from the coagulator vessel per minute.

Examination of the crumbs shows them to be substantially uniform in size, somewhat irregular in shape, and slightly porous in character. The crumbs produced are subsequently easily dried in a hot-air oven to produce a low-solvent, highly commercial elastomeric product.

*Example II*

In another experiment, the desired coagulation is achieved in an apparatus identical to that used in the first example. The composition and feed rate of cement are the same as that of the preceding example, and as in the case of the first experiment, 6.67 lbs. per minute of 20° C. motive water are fed to the mixer. In this example, however, the steam—140 p.s.i.g.—fed to the mixing device is lowered to a rate of approximately 5.92 lbs. per minute. Such lower steam rate is reflected in the temperature of the coagulator vessel water which in this second experiment is 120° C. rather than the 135° C. of Experiment I.

The flow rates produced in the mixing device are as follows:

| Material: | Velocity—ft. per sec. |
|---|---|
| Cement velocity at perforated cone | 5.8 |
| Steam velocity at tip of entry conduit | 403 |
| Motive water velocity at tip of entry conduit | 1.3 |

The momentum of steam is calculated to be 210 ft. lbs. per second of steam per pound of cement.

The rate of crumbs leaving the coagulator vessel averages 1.46 lbs. per minute, containing approximately 0.15 lb. of benzene. The product is quite similar to that obtained in the first example; however, the average crumb size is slightly larger, being about 5/16 of an inch in diameter.

*Example III*

In another experiment using apparatus substantially the same as that employed in the foregoing experiments, cement, containing approximately 15.8% water on a volume basis, motive water and steam are fed into the mixing device in the usual fashion. The composition of the cement thus introduced is as follows:

| Material: | Amount—lbs. per min. |
|---|---|
| Cis-1,4 polybutadiene | 2.24 |
| Butadiene-1,3 | .96 |
| Benzene | 8.93 |
| Butene-1 | 5.75 |
| Water | 5.68 |

As in the previous experiments, approximately 6.67 lbs. per minute of motive water, controlled at a temperature of 20° C., are added to the mixing device. Steam at a pressure of 140 p.s.i.g. is also introduced to the mixer at a rate of 11.2 lbs. per minute.

Appropriate computation shows the rates within the mixing device to be as follows:

| Material: | Velocity—ft. per sec. |
|---|---|
| Cement velocity at preforated cone | 8.95 |
| Steam velocity at tip of entry conduit | 612 |
| Motive water velocity at tip of entry conduit | 1.32 |

The steam momentum is determined from the above values to be 382 ft. lbs. per second of steam per pound of cement fed.

Typically, observation of the impacted motive water, cement, and steam—observed through a glass bull's-eye located between the coagulator vessel and mixing device—discloses a substantially gaseous (apparent) phase to have been obtained, indicating that proper fragmentation and coagulation has been achieved.

The coagulator vessel, operated at a temperature of 135° C. and a pressure of 74 p.s.i.g., is seen to contain a relatively uniform suspension of crumbs having an average size of 3/16 inch. Removed from the coagulator vessel as vapors are the following:

| Material: | Amount—lbs. per min. |
|---|---|
| Butadiene-1,3 | .962 |
| Benzene | 8.70 |
| Butene-1 | 5.75 |
| Water | 4.35 |

Also removed from the coagulator vessel during the run are polybutadiene product, 2.24 lbs. per minute, containing a small amount of benzene, i.e. 0.22 lb. per minute; and 19.1 lbs. of water per minute.

As in the previous examples, the crumbs are quite uniform in size, irregular in shape, and have an off-white color. The product is subsequently dried in a hot-air tray drier to produce a high quality, elastomeric product, particularly suitable to commercial employment because of its low residual solvent content.

Example IV

Another run is carried out in the equipment of Example I, the techniques employed being substantially similar to the previous experiments.

Fed to the mixing T in this experiment is cement, containing approximately 32.7% water on a volume basis, maintained at a temperature of about 20° C., having the composition and flow rates shown in the table immediately below:

| Material: | Amount—lbs. per min. |
|---|---|
| Cis-1,4 polybutadiene | 1.82 |
| Benzene | 11.25 |
| Water | 6.92 |

Approximately 10.5 lbs. per minute of steam—140 p.s.i.g.—are added to the mixer. No motive water is employed.

Calculated velocities of components in the mixer are as follows:

| Material: | Velocity—ft. per sec. |
|---|---|
| Cement velocity at perforated cone | 7.55 |
| Steam velocity at tip of entry conduit | 855 |

In this example, the momentum of steam is computed to be 689 ft. lbs. per second of steam per pound of cement.

Withdrawn as vapors from the vapor space in the coagulator vessel, which is maintained at 125° C. and 43 p.s.i.g., are 11.08 and 6.26 lbs. per minute, respectively, of benzene and water.

The impacted mixture appears to comprise a single gaseous phase and is introduced beneath the surface of the coagulator vessel water to produce a uniform suspension of crumbs averaging ¼ to ½ inch in diameter.

Product crumbs are withdrawn from the coagulator vessel at a rate of 1.82 lbs. of crumb per minute containing approximately 0.17 lb. of benzene. The crumbs in this instance are substantially white, irregular in shape, and readily dried as previously described.

Example V

In an additional experiment a run is carried out using procedures similar to those employed in the preceding examples.

In the experiment, polybutadiene cement is furnished to the mixing T at a temperature of 20° C. and a pressure of 100 p.s.i.g. The cement has the composition and flow rates shown in the following table:

| Material: | Amount—lbs. per minute |
|---|---|
| Cis-1,4 polybutadiene | 0.82 |
| Butadiene-1,3 | 0.25 |
| Benzene | 0.70 |
| Butene-1 | 4.18 |
| Water | 12.5 |

Also fed to the mixing T are 2.86 pounds per minute of steam at 140 p.s.i.g.

The calculated velocities of the components in the mixture are as follows:

| Material: | Velocity—ft. per second |
|---|---|
| Cement-water suspension (60% water on a volume basis), velocity at perforated cone | 7.25 |
| Steam velocity at tip of entry conduit | 185 |

The momentum of the steam is calculated to be 29 ft. pounds per second per pound of cement-water suspension.

Again, the efficiency of coagulation is observed through a glass bull's-eye located upstream of the mixing device. Such examination reveals an apparent single gaseous phase, showing satisfactory operation of the process.

The coagulator vessel, which is operated at a temperature of 90° C. and a pressure of 60 p.s.i.g., is seen to contain a typical uniform suspension of crumbs having an average size of approximately ³⁄₁₆ inch. Removed from the coagulator vessel as vapors are the following:

| Material: | Amount—lbs. per minute |
|---|---|
| Butadiene | 0.25 |
| Benzene | 0.62 |
| Butene-1 | 4.18 |
| Water | 0.24 |

Also removed from the vessel in the course of the experiment are rubber crumbs which leave at a rate of about 0.82 pound per minute. Benzene and water are removed as liquids in amounts of 0.082 and 15.12, respectively, pounds per minute.

The crumbs thus obtained are relatively uniform in both size and appearance and are subsequently dried in a hot-air tray dryer to yield a commercially acceptable product.

Example VI

In a still further experiment, a coagulator vessel of a type similar to that shown in FIGURE 3 is fabricated with a motor-driven agitator shaft upon which are mounted three agitator blades spaced vertically one above the other. At the extreme lower end of the shaft, is positioned a six-bladed turbine-type agitator having 12 inch diameter x 1½ inch wide blades. Spaced about this agitator at 120° intervals—⅝ inch outward from, and approximately ¼ inch below the tips of the blades—are located three cement inlets, each of which comprises three ¼ inch diameter inlet holes, 1½ inches apart on centers, positioned in a manifold arrangement connected to a source of cement feed. Above the turbine agitator, located at the 4-gallon level of the vessel, is a 12 x 12 inch marine, down-pumping agitator blade connected to the shaft at the 34-gallon level. Mounted on the shaft at the 53-gallon position is a 12 inch by 12° Brumagim four-bladed agitator. The vessel, which during operation is filled to the 80-gallon level, has an internal diameter of 24 inches and is fitted with two, 2-inch wide baffles mounted one inch from the vessel's wall. The agitator shaft of the vessel is rotated at a constant speed of about 330 r.p.m.

During the experiment, the contents of the tank are maintained at a temperature of 90° C. by means of 140 p.s.i.g. steam sparged into the vessel through a nozzle provided in the vessel's wall. Vapor is removed from the vessel and the pressure maintained at a value of about 104 p.s.i.g. Approximately, 3.56 gallons per minute of cement, having a density of 5.63 lbs. per gallon at 20° C. mixed with 0.8 gallon per minute of water are employed in the experiment as feed material. The mixture includes the following:

| Material: | Amount—lbs. per minute |
|---|---|
| Cis-1,4 polybutadiene | 3.1 |
| Butadiene-1,3 | 0.7 |
| Butene-1 | 12.7 |
| Benzene | 2.8 |
| Water | 6.7 |

The cement, at a temperature of 26° C., and containing approximately 16.8% water on a volume basis, is introduced to the manifold arrangements located immediately adjacent the turbine agitator as described above. Upon emerging from the manifolds, the streams of cement are disintegrated by the strong flow of hot water produced by the turbine agitator. Substantially simultaneously, solvent is flashed from the cement to produce a uniform crumb having the desired characteristics. Motive water is continuously supplied through an inlet in the vessel's side, and crumb product is periodically removed through a product outlet as dictated by a controlled liquid level instrument.

The crumbs produced are substantially white in color and provide a low solvent product adapted to drying and further processing as required.

What is claimed is:

1. A process for effecting controlled precipitation of a member selected from the group consisting of polybutadiene, polyisoprene and terpolymers containing ethylene and propylene monomeric units from a solution thereof in a hydrocarbon solvent comprising forming a suspension of said solution and water into a completely confined stream and passing said stream into a mixing zone, passing a completely confined stream of steam into said mixing zone at an angle of incidence with the first named stream, bringing said streams together while still completely confined with sufficient impact as to cause fragmentation of said suspension and effect substantially instantaneous release of sufficient of said solvent to obtain from the fragments of said suspension discrete solid particles, and passing the resulting combined streams from said mixing zone to a separation zone whereby release of said solvent by said particles is substantially completed.

2. A process according to claim 1 in which said suspension contains water in an amount from about 5% to about 50% on a volume basis.

3. A process for precipitating substantially dissolved solid from solvent comprising fragmenting a stream of suspension comprising water mixed with a solution of said solid and said solvent by impacting said suspension with steam in an amount at least sufficient to produce substantial vaporization of the solvent, said fragmenting occurring in a T configuration mixing device in which said suspension enters the device through one of the legs of said mixing device and the steam enters through one of the other legs.

4. A process for precipitating a substantially dissolved solid, selected from the group consisting of polybutadiene, polyisoprene, interpolymers containing styrene and butadiene monomeric units and interpolymers containing ethylene and propylene monomeric units, from a suspension of a solution of said substantially dissolved solid in a substantially water-immiscible solvating organic liquid, and water, said suspension containing water in an amount from about 1% to about 50% on a volume basis, comprising impacting rapidly-moving steam with said suspension in a T configuration mixing device wherein the suspension stream enters said device by way of one leg of the T, said steam enters through one of the other legs of the T, and following impact, the impacted mixture leaves said mixing device through its remaining leg.

5. A process according to claim 4 in which the T configuration mixing device has a perforated plate disposed in the leg of the T through which the suspension stream enters, upstream of the point at which the suspension is impacted with steam.

References Cited by the Examiner
UNITED STATES PATENTS

| | | | |
|---|---|---|---|
| 2,330,038 | 9/1943 | Ervin | 264—11 |
| 2,460,992 | 2/1949 | Le Brasse et al. | 264—11 |
| 2,636,219 | 4/1953 | Beamer et al. | 264—11 |
| 2,636,555 | 4/1953 | Klepetko et al. | 159—48 X |
| 2,957,855 | 10/1960 | McLeod | 260—88.2 |
| 2,964,512 | 12/1960 | Goins | 260—94.9 |
| 2,969,347 | 1/1961 | Bellinger et al. | 260—94.9 |
| 2,974,131 | 3/1961 | McLeod | 260—94.9 |
| 3,026,314 | 3/1962 | Cottle et al. | 260—94.9 |
| 3,042,970 | 7/1962 | Terenzi | 264—11 |
| 3,050,113 | 8/1962 | Rundquist | 159—13 |
| 3,056,772 | 10/1962 | Wallace | 260—94.9 |
| 3,080,354 | 3/1963 | Moon | 260—94.9 |
| 3,202,647 | 8/1965 | Todd et al. | 260—94.7 |
| 3,208,829 | 9/1965 | Terenzi | 23—252 |

FOREIGN PATENTS

| | | |
|---|---|---|
| 206,588 | 2/1957 | Australia. |
| 391,358 | 10/1908 | France. |
| 824,193 | 11/1959 | Great Britain. |

NORMAN YUDKOFF, *Primary Examiner.*

J. SOFER, *Assistant Examiner.*